July 5, 1949.                J. A. PURVIS                2,474,914
                AUTOMATIC SERVICE GUIDE AND RECORDER
                      FOR AUTOMOTIVE APPARATUS
Filed May 3, 1945                              6 Sheets-Sheet 1

INVENTOR.
Judson A. Purvis

July 5, 1949.        J. A. PURVIS        2,474,914
AUTOMATIC SERVICE GUIDE AND RECORDER
FOR AUTOMOTIVE APPARATUS
Filed May 3, 1945        6 Sheets-Sheet 6

INVENTOR.
Judson A. Purvis
BY
Parkinson & Lane
Attys

Patented July 5, 1949

2,474,914

UNITED STATES PATENT OFFICE 2,474,914

AUTOMATIC SERVICE GUIDE AND RECORDER FOR AUTOMOTIVE APPARATUS

Judson A. Purvis, Chicago, Ill., assignor to Lube-X Systems, Inc., Chicago, Ill., a corporation of Illinois Application May 3, 1945, Serial No. 591,666

15 Claims. (Cl. 35—54)

The present invention relates to a novel means and mechanism for use in the servicing of automotive apparatus including automobiles, trucks, aircraft, etc.; and especially to a novel mechanism for automatically selecting a lubrication or servicing chart of a desired make and model of apparatus, projecting an enlarged and illuminated image of the chart upon a screen to serve as a guide in the servicing operation, recording the services performed and furnishing a printed record of such services to the owner of the apparatus and to the service station.

The present method employed in servicing automotive apparatus is for the service station to employ charts or sheets of the various makes and models of such apparatus for use as a guide in the servicing operation. These charts may be loose or in book form, but as a general rule are on a relatively small scale because of the large amount of information they must contain. Therefore, the operator must keep them close by and move them as he proceeds to service the various parts. Furthermore, they must be frequently handled by the operator and consequently become readily soiled by the oils or greases required in the lubrication or servicing operations.

One of the important advantages and objects of the present invention is that the selecting and projecting is accomplished automatically and the servicing is positively recorded upon a permanent record. The apparatus is so constructed and designed that should the operator leave the apparatus being serviced before completing the servicing operations, he may return and pick up or continue with the operations to be performed without the possibility of his omitting any point requiring service. This recording or printing is manually initiated and controlled and the record or receipt is so located during servicing as to visually indicate to the operator the several or more points serviced and those to be serviced.

The invention further comprehends printing the complete service instructions upon a reduced scale upon a transparent member adapted to be so disposed in the machine as to be quickly selected and moved into focus and to project the information thereon onto a screen or transparency on an enlarged scale and thereby greatly facilitate the reading of this information.

Another object of the present invention is to provide a novel selector mechanism to bring into focus the particular make and model of automobile, truck or other apparatus to be serviced.

A still further object of the present invention is to provide a novel form of recording device which shows at a glance the points the operator has serviced and those to be serviced so that when the servicing job has been completed the operator has a complete record of the parts serviced. Preferably such records are in duplicate, so that the owner of the vehicle is also provided with a record or receipt.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

Figures 1, 13:
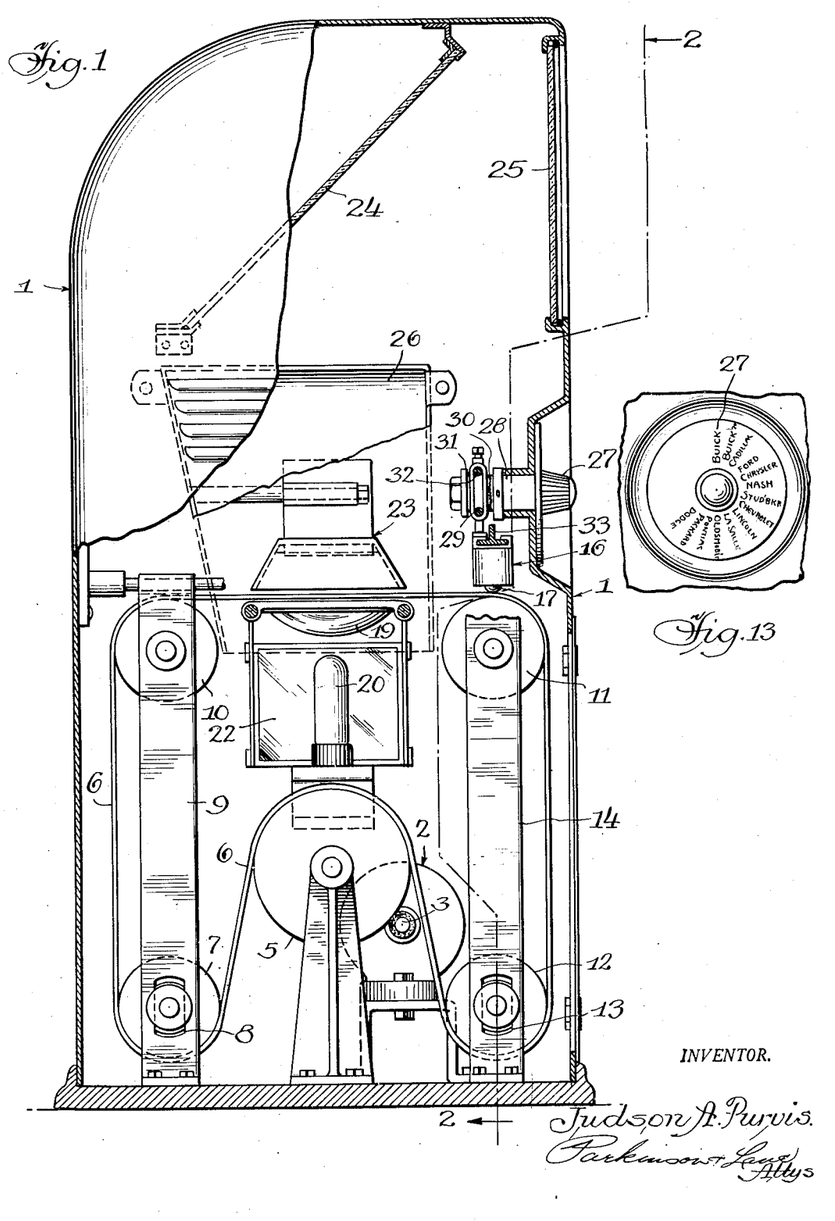
Figure 1 is a view part in side elevation and part in vertical cross section through the novel selecting, projecting and recording mechanism for servicing various makes and models of automotive apparatus, the view being taken on the line 1—1 of Figure 2.
Fig. 13 is a front view of the selector dial.

Referring more particularly to the illustrative embodiment disclosed in the drawings, the invention comprises a housing or cabinet 1 providing an enclosure for the unit assembly of automatic service guide and recorder including the novel selecting, projecting and recording mechanism for the complete servicing of various makes and models of automotive apparatus. Within this housing is mounted a motor 2 upon the shaft 3 of which is mounted a roller 4 frictionally contacting a drum 5 for driving a belt 6. As shown in Figure 1, the belt passes over an idler roller or drum 7 freely journalled within an elongated slot 8 in the lower end of a standard or support 9. The belt then passes over an idler roller or drum 10 journalled in the support 9, through a projecting apparatus and then over an idler roller or drum 11 and an idler roller or drum 12, the latter being freely journalled within an elongated slot 13 in the lower end of a standard or support 14. The idler rollers or drums 7 and 12, due to their free mounting and weight, maintain the belt 6 taut as it passes thereover.

Complete instructions for each make and model of automotive apparatus are printed upon transparent members or micro-films 15 with a sufficient number of the transparent members or micro-films to permit the servicing or lubrication of the various makes and models, being mounted in spaced relation on the belt 6 in such manner that when the drum 5 is rotated and the belt 6 is driven, it will bring into focus in the projecting apparatus the desired transparent member or micro-film carrying the necessary information for servicing that particular make and model.

Figure 9:
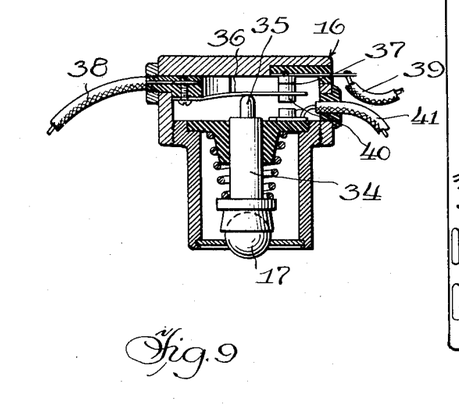
Figure 9 is a view in vertical cross section through the novel floating switch for controlling the movement of the belt carrying a plurality of transparent members containing the desired servicing charts and necessary information concerning the servicing operations of the various makes and models of automotive apparatus.

Movement of the belt is controlled by a floating switch 16, shown in more detail in Figure 9, which switch contains a spring pressed ball 17 adapted to seat in a selected one of a series of openings 18 in the belt and when positioned in such selected opening disconnects power to the motor and immediately stops rotation of the belt 6. At such time the desired film is directly over the lens 19 of the projection apparatus and contact is made whereby the illuminating lamp 20 is energized so that light is projected through the lens 21 to the mirror 22 (see Figure 2) which reflects the light through the lens 19 and selected film 15 to an enlarging and focusing lens 23, to an angular mirror 24 and upon the transparent screen 25 for visually projecting an enlarged image of the chart selected.

The lamp or illuminating source 20 is placed directly beneath a ventilator 26 and to one side of the belt containing the films so as to quickly dissipate the heat from the lamp and prevent its injuring the film on the belt 6.

When the operator has determined the make and model of automobile or other automotive apparatus to be serviced, he rotates the selector dial 27 which preferably contains the various makes and models and which visually indicates through suitable indicating means thereon when it has been rotated to select the particular make and model of automobile desired. Rotation of the shaft 28 of this dial causes the endless belt 29 to rotate over pulleys 30 and 31 to thereby move the bracket or support 32 carrying the floating switch 16 upon its guide or rail 33 until the ball 17 carried by this switch drops into the opening 18 opposite or aligned with the designated or desired film 15 and which film is brought into registry or directly over the lens 19 of the projecting device. At such time, the spring-pressed plunger 34 forces the ball 17 into the opening and the reduced end 35 of this plunger permits the spring contact 36 to drop to thereby disengage the contacts 37 which supply current to the motor through the wires 38 and 39, and causes the contacts 40 to be engaged whereby to close the circuit to the illuminating and projection lamp through the wires 38 and 41.

It will thus be seen that at such time that the motor is stopped from rotating, the belt 6 remains stationary. However, the lamp 20 is energized when the designated chart is brought into focus and light is projected through the film 15 and its associated lens so as to project the enlarged image of the chart on the micro-film onto the mirror 24 which in turn reflects this enlarged image upon the screen or other transparency 25. Thus the operator has an enlarged illuminated image of the chart and its descriptive matter to guide and permit him to properly service the desired or selected parts of the automotive apparatus, it being understood that the cabinet 1 may be placed at any convenient place and is sufficiently small and mobile that it may be moved to any desired location.

Figure 8:
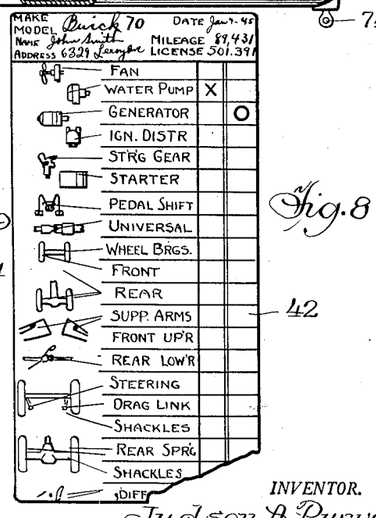
Figure 8 is a plan view of a form of receipt.

In order that the serviced parts may be indicated and a recording thereof made, the invention comprehends the insertion of a printed receipt form 42 into a carrier or receptacle 43 mounted in the front of the cabinet. The printed receipt may be of any desired form but Figure 8 shows an illustrative embodiment having indicated thereon the parts to be serviced and spaced colums to be checked thereon to show that these parts have or have not been serviced. Preferably the receipt is in duplicate.

Figures 6, 7:
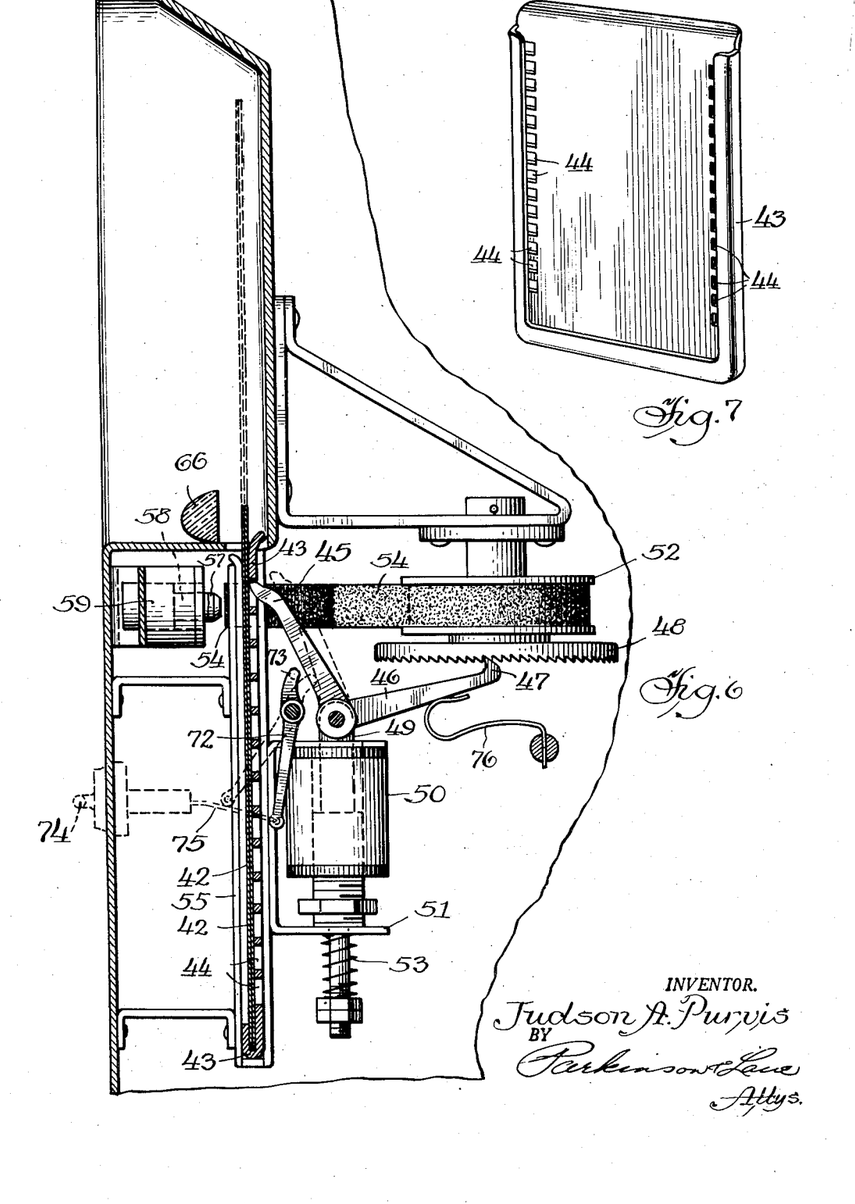
Figure 6 is a view similar to Figure 5 but showing another position of the carrier and servicing receipt just prior to the commencement of the servicing operation.
Figure 7 is a view in perspective of the holder for the receipt.

The carrier or receptacle for the printed receipt is provided with one or more series of longitudinally spaced notches or cut-outs 44 for the reception of an end of a dog or latch 45 secured to an end of a pawl 46, the other end 47 of which is adapted to be received in the toothed or serrated underside of a ratchet wheel 48. The dog or latch and pawl are pivotally mounted upon the plunger or core 49 of a solenoid 50 suitably mounted within a bracket or support 51. The ratchet is mounted on the underside of a rotatable drum 52. Thus as the solenoid is deenergized (see Figure 6), the plunger or core 49 is retracted by the spring 53 and in such retraction the end 47 of the pawl which engages a tooth of the ratchet, rotates the ratchet and drum a predetermined distance. This rotation in turn rotates a carbon ribbon or tape 54 wound about the drum and about the arcuate guides 55 and 56 which provide a channel and guides for the vertical movement of the carrier or receptacle 43. As the plunger or core 49 is forced outwardly upon the solenoid 50 being energized, it raises the dog or latch 45 seating in a slot 44 and in turn elevates the carrier or receptacle 43 a desired amount sufficient to place a new entry on the receipt 42 immediately behind the carbon tape or ribbon 54 and in position to be impressed by type on the dies 57 provided on the outer end of the plungers or cores 58 of the solenoids 59 and 59a. These solenoids 59 and 59a are energized by the operator pressing the button 60 to close the contact 61 upon the operator having serviced that part of the automotive apparatus. One die may be provided with a type forming the letter X and the other provided with the letter O or other mark, thereby showing whether the part has or has not been serviced. Associated with the button 60 are provided three contacts a, b and c. The center contact a when engaged by the contact on the button 60, energizes the solenoid 59 to raise the carrier 43 and receipt 42 a notch, and then moving the button 60 to engage the contact b, it energizes the solenoid 59 and causes its core or plunger 58 to impress an X on the receipt to show that the designated part has been serviced. Or, if it has not been serviced, the button is moved to engage the contact c and energize the solenoid 59a which impresses an O or other designation on the receipt. Each receipt may have separate columns for these designations.

Figure 11:
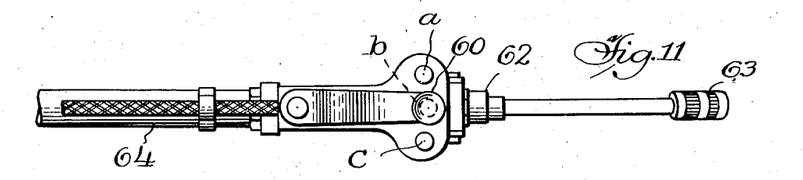
Figure 11 is a top plan view of the manual control switch attached to the lubrication gun or nozzle for actuating the printing mechanism as the operator services the designated part.
Figure 12:
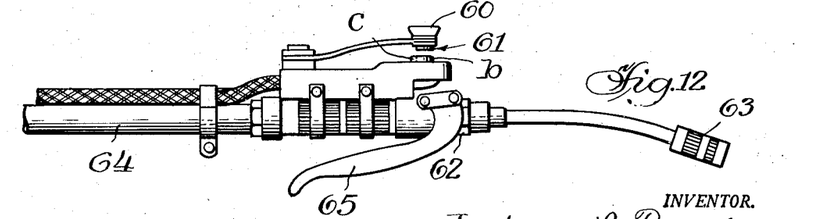
Figure 12 is a view in side elevation of the mechanism shown in Figure 11.

The button or switch 60 is shown (see Figures 11 and 12) as being mounted upon the lubrication gun or nozzle 62 having the usual fitting 63 adapted to be connected to the part to be lubricated and a hose 64 connected to a source of lubricant supply. Thus as the operator actuates the handle or trigger 65 for discharging the lubricant to the nozzle, he also presses on the button 60 to close the switch which energizes the solenoids 59 and 59 or 59a and causes the type on either die 57 to engage the tape or ribbon 54 and cause the tape or ribbon to be forced into contact with the receipt 42 and impress upon it a suitable designation showing that that part has or has not been serviced. In order that the operator may quickly see the parts that have been lubricated or serviced, a magnifying lens 66 is provided.

In order to permit the tape or ribbon 54 to engage the receipt 42 when either plunger or core 58 is projected into contact therewith, a roller 67 freely rotatable on the outer end of a lever arm 68 is provided. This arm is fulcrumed at 69 upon a bracket 70 and with its opposite end connected to a spring 71 holding the roller into contact with the tape or ribbon.

Figure 5:
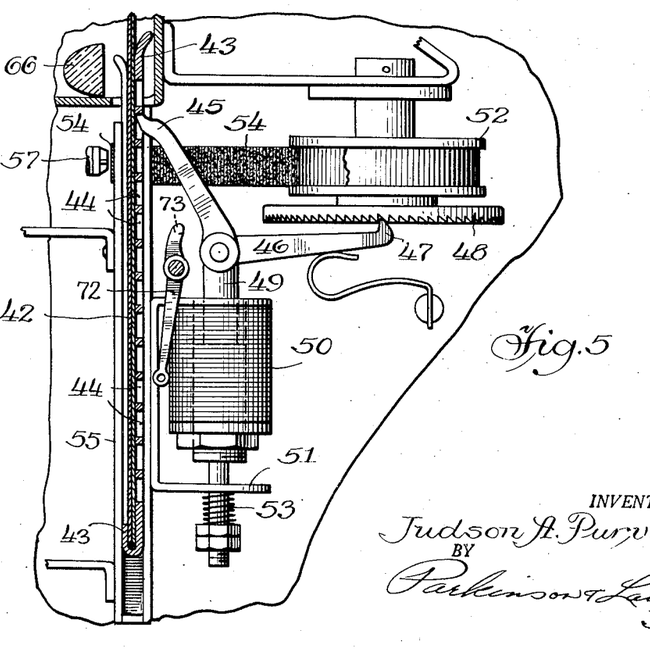
Figure 5 is a fragmentary enlarged view part in vertical cross section and part in side elevation of the mechanism of Figure 4 and showing the manner of manipulating the carrier and servicing receipt.

In order to release the latch 45 from a slot 44 in the carrier to permit this carrier to be depressed or moved into its lowered position, as for example, when the carrier is ready for receiving a new receipt for another servicing, the invention comprehends providing an arm 72 (see Figures 5 and 6) which is pivotally mounted in such manner that the free end 73 thereof may engage the pawl and hold it out of a slot 44 until the carrier is lowered or moved to the position it occupies when servicing is commenced. This may be accomplished by manual withdrawal of the handle 74 and rod 75. Preferably this rod is spring-pressed so as to normally retain the arm 72 in the full line positions shown in Figures 5 and 6. In order to maintain the latch 45 and pawl 46 in their engagement with the carrier 43 and ratchet 48, a leaf spring 76 engages this pawl.

Figure 2:
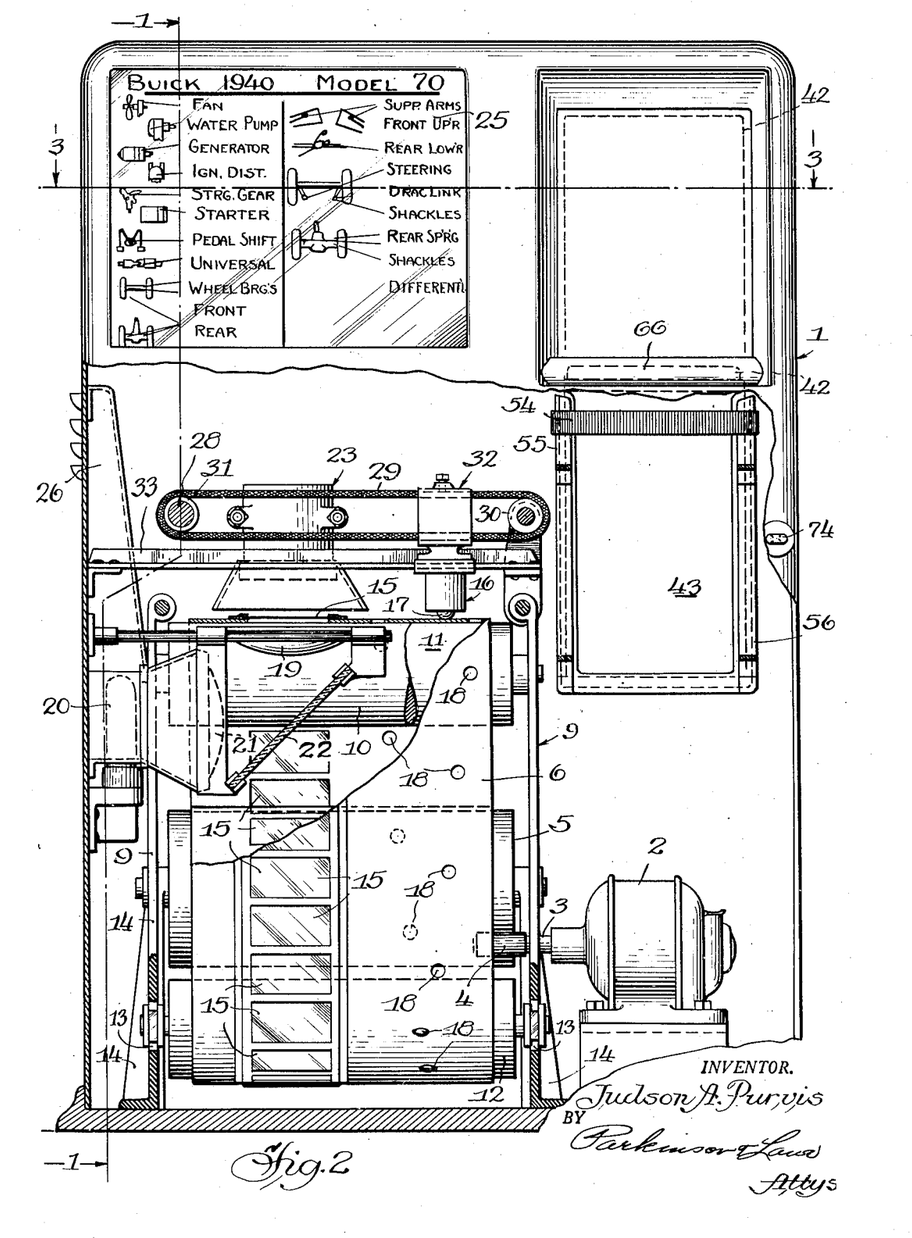
Figure 2 is a view part in vertical cross section and part in front elevation of the novel mechanism taken on the line 2—2 of Figure 1.
Figure 3:
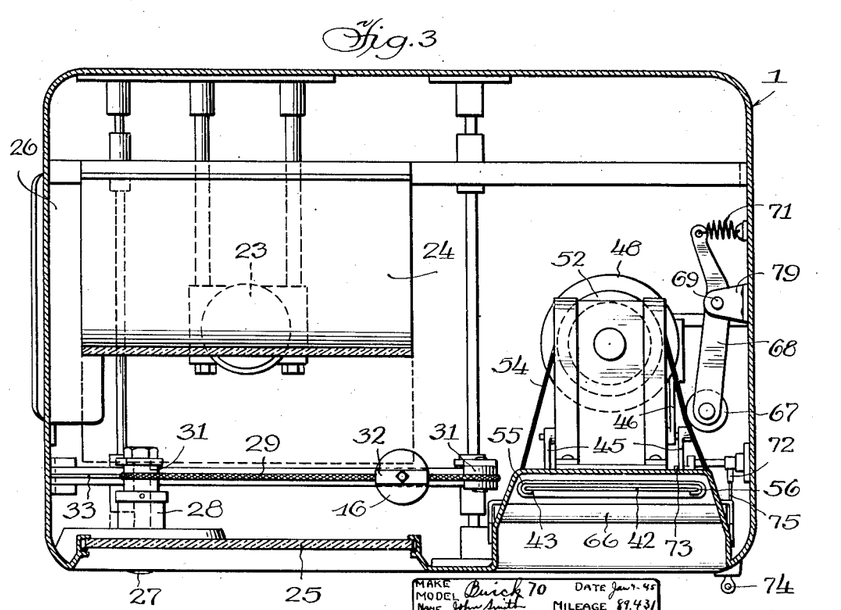
Figure 3 is a view in horizontal cross section taken on the line 3—3 of Figure 2.
Figure 4:
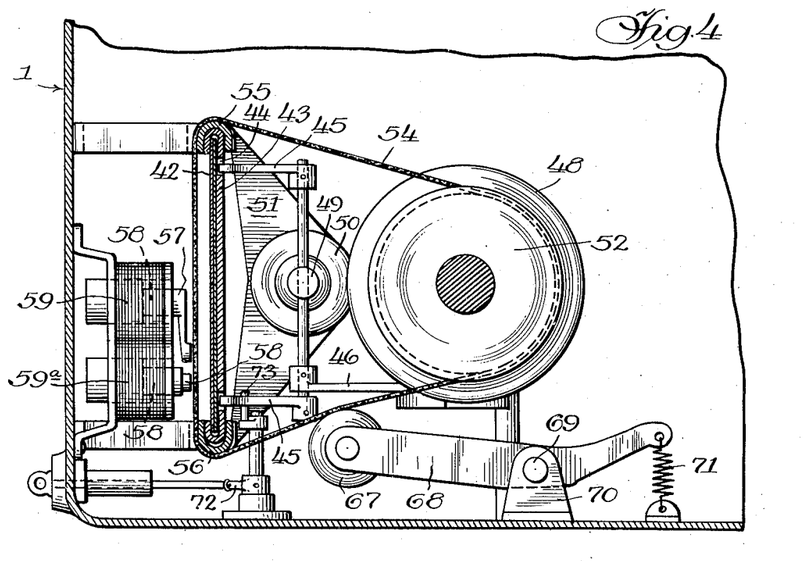
Figure 4 is a fragmentary enlarged top plan view with parts in horizontal cross section of the printing or recording mechanism and showing more particularly the manner of printing the receipt of the services performed.

The form of chart provided on the transparent member or micro-film 15 is shown more clearly in Figure 2 where it is shown as projected upon the screen 25. This chart may be similar to that disclosed in my Patent No. 2,181,588 granted November 29, 1939, and upon which chart is provided descriptive matter and the same sequence of parts to be serviced or lubricated as upon the printed receipt. Thus the operator in the servicing operation is at all times visually apprised of the parts to be serviced and the sequence thereof so that he is fully cognizant of the successive servicing operations disclosed on the printed receipt 42.

Figure 10:
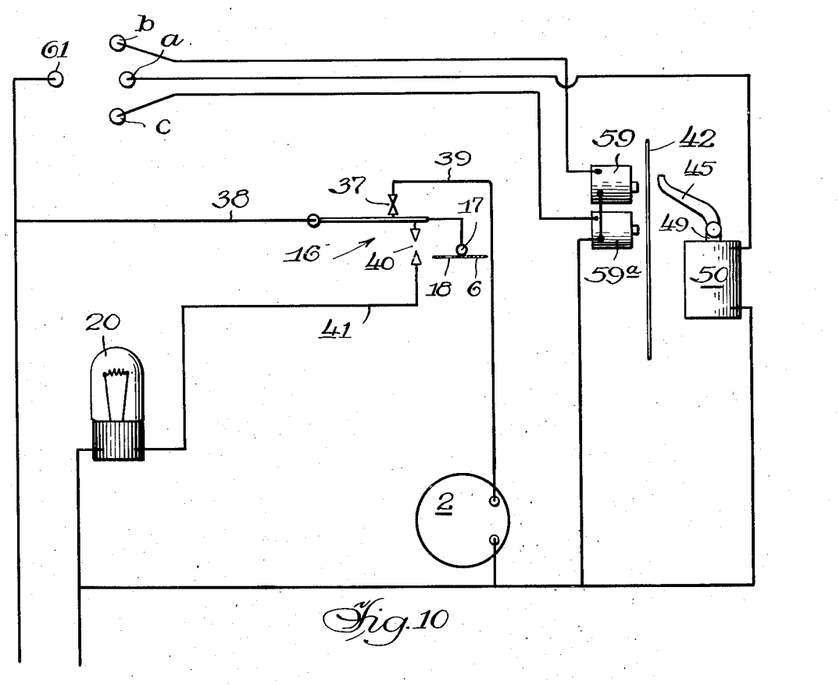
Figure 10 is a wiring diagram for the electrical connections to the operating mechanism.

In the servicing operations, the operator places the unit or cabinet at a readily accessible place for the lubrication or servicing and connects it to an available electric socket. Then upon moving the dial or selector switch 27, current flows through the wire 36, contacts 37 and wire 39 to the motor 2, causing the motor to operate (see Figures 9 and 10). The motor continues to rotate the belt 6 until the ball 17 drops into an opening 18 opposite the selected chart 15, whereupon the motor stops. At that instant the contacts 40 of the switch 16 close and current flows through the wires 38 and 41 to the lamp 20 which projects a beam of light through the optical system and selected chart, and projects an enlarged image of the chart upon the screen 25.

As the operator services the parts of the apparatus by means of the lubrication gun or nozzle 62, he also manipulates the button 60 to print the record of the servicing operations and then, also by means of this button or switch, elevates or moves the carrier 43 and printed receipt 42 to a new position for the next operation.

Having thus disclosed my invention, I claim:

1. In a service guide and recording mechanism for the servicing of automotive apparatus, means for projecting a chart containing a reproduction and description of the parts to be serviced of a desired make and model of apparatus upon a screen to guide the operator in the servicing operation, a recording device on the exterior of the mechanism and provided with a separate record having similarly aligned reproductions and descriptions of the parts serviced, said device being actuated by the operator as he completes each servicing operation.

2. In a service guide and recording mechanism for the servicing of automotive apparatus, means for projecting a chart containing a reproduction and description of the parts to be serviced of a desired make and model of apparatus upon a screen to guide the operator in the servicing operations, a device for servicing the parts of the apparatus, and means associated with said device for making a printed record of the said operations as each part is serviced.

3. Mechanism for guiding an operator in the servicing and lubrication of automotive apparatus, comprising a series of servicing charts for various makes and models of apparatus, means for selecting the desired make and model, means for projecting an enlarged image of the chart selected upon a screen to facilitate the servicing operations, and a recording device on said mechanism and actuated by the operator as he completes each servicing operation for making a printed record as each servicing operation is performed.

4. Mechanism for guiding an operator in the servicing and lubrication of automotive apparatus and for recording the servicing operations, comprising a series of servicing charts for various makes and models of apparatus, means for selecting the chart of a desired make and model, means for projecting an enlarged image of the selected chart upon a screen to facilitate the servicing operations, a device for performing the servicing operations, and recording means actuated by the operator as he performs such operations for successively making a printed record of the servicing operations as each operation is performed.

5. In a service guide and recording mechanism for the servicing of automotive apparatus, a series of charts containing reduced reproductions and instructions as to the parts of the apparatus requiring servicing, means for selecting a chart of a desired make and model of apparatus, a screen, means for automatically projecting an enlarged image of the selected chart upon the screen, and a recording device including a record having reproductions and instructions similarly arranged to those on the chart and means actuated by the operator as he performs the servicing operations for recording on said record the servicing operations performed.

6. Mechanism for guiding an operator in the servicing and lubrication of automotive apparatus, comprising a series of servicing charts containing reduced reproductions and instructions as to the parts of the apparatus requiring servicing, means for selecting a chart of a desired make and model of apparatus, a screen, means for projecting an enlarged image of the selected chart upon the screen, mechanism for servicing the parts of the apparatus, a record having reproductions and instructions aligned in the same manner as on the charts, and means associated with the servicing mechanism for making a printed receipt on said record of each part as it is serviced during the servicing operations.

7. An electrically operated service guide and recorder for automotive apparatus, comprising a portable unit provided with a series of charts containing reproductions and instructions of the various makes and models of apparatus to be serviced, means for selecting a desired chart, a screen, means for projecting an enlarged image of the selected chart upon the screen, a carrier adjustably mounted in the front of the casing, a record carried in the carrier and containing the aligned information on the charts, means for moving said carrier as each operation is to be performed, and means for recording on said record the results of the servicing operations.

8. An electrically operated service guide for selecting and projecting an enlarged image of a lubrication and servicing chart upon a screen to facilitate the servicing operations, comprising a portable unit including a casing, a screen positioned in a wall of the unit and readily accessible to the operator, a series of charts containing the information required in the servicing of various makes and models of apparatus, selecting mechanism for selecting a predetermined make and model of apparatus, an optical system for projecting the selected chart upon the screen, means for projecting the selected chart when this chart is moved into its proper position and relation with the optical system, and a carrier adjacent the screen carrying a record of the parts to be serviced.

9. In a self-contained, electrically operated service guide and recording mechanism for the servicing of automotive apparatus, a plurality of lubrication and servicing charts for various makes and models of apparatus, means for selecting and projecting an enlarged image of a selected chart for guiding the operator in the servicing operations, a device including a printed record for recording thereon each servicing operation as it is performed by the operator, and means actuated by the operator as he performs the successive servicing operations for recording in sequence each of the operations upon the printed record.

10. In a self-contained, electrically operated service guide and recording mechanism for the servicing of automotive apparatus, a plurality of lubrication and servicing charts for various makes and models of apparatus, means for selecting and projecting an enlarged image of a selected chart for guiding the operator in the servicing operations, a device including a printed record of the servicing operations to be performed, and means controlled by the operator as he performs the successive servicing operations for recording each of the servicing operations upon the printed record as each of such operations is completed.

11. A device associated with the usual lubricating gun employed in the lubricating and servicing of automotive apparatus, comprising a chart provided with the designation of each of the parts to be serviced, a column adjacent said parts, printing mechanism associated with said column, and means on the lubricating gun controlled by the operator for operating the printing mechanism and thereby placing a designated mark in the column adjacent each part as that part is serviced to thereby apprise the operator of the parts serviced.

12. A printing device associated with the usual lubricating gun employed in the lubricating and servicing of automotive apparatus, comprising a chart provided with the designation of each of the parts to be serviced, a column adjacent said parts to be marked to show whether such parts were serviced by the operator, mechanism for applying a mark to said column, and a switch mounted on the gun and controlled by the operator for actuating said mechanism and thereby placing a designated mark in the column adjacent each part as that part is serviced to apprise the operator of the parts serviced.

13. A printing device controlled by the operator from the hand grip on the lubricating nozzle used in the lubricating and servicing of automotive apparatus, comprising a carrier, a printed record adapted to be positioned in the carrier and including a chart provided with the designation of each of the parts to be serviced, means for printing on said record a designation to show the parts serviced, and means for moving the carrier to disclose to the operator the succeeding parts to be lubricated.

14. In an electrically operated service guide and recording mechanism for the servicing of automotive apparatus, a movable carrier, a printed receipt comprising a chart designating the parts to be serviced and adapted to be received in the carrier, one or more columns on the receipt adjacent said designations, a printing device controlled by the operator during the servicing operations for successively recording the operations on the receipt as they are performed, and means for moving the carrier and receipt as each operation is completed to show the succeeding operations still to be performed.

15. In an electrically operated service guide and recording mechanism for the servicing of automotive apparatus, a movable carrier, a printed receipt comprising a chart designating the parts to be serviced and adapted to be received in the carrier, one or more columns on the receipt adjacent said designations, and electrically operated mechanism actuated by the operator during the servicing operations for successively recording the various operations in the designated columns of the receipt as they are performed and moving the carrier and receipt upon the recording of one operation to a position for recording a subsequent operation.

JUDSON A. PURVIS.

REFERENCES CITED

The following references are of record in the file of this patent:

UNITED STATES PATENTS

| Number | Name | Date |
|---|---|---|
| 433,461 | Fowler | Aug. 5, 1890 |
| 623,889 | Daly | Apr. 25, 1899 |
| 1,176,704 | Duval | Mar. 21, 1916 |
| 1,199,195 | Lewis | Sept. 26, 1916 |
| 1,279,464 | Skinner | Sept. 17, 1918 |
| 1,385,354 | Ayres | July 26, 1921 |
| 1,605,450 | Matthews | Nov. 2, 1926 |
| 1,904,356 | Conklin | Apr. 18, 1933 |
| 2,085,920 | McCoy | July 6, 1937 |
| 2,109,849 | Price | Mar. 1, 1938 |
| 2,159,925 | Wood | May 23, 1939 |
| 2,181,588 | Purvis | Nov. 28, 1939 |
| 2,291,931 | Troeger | Aug. 4, 1942 |
| 2,323,372 | Bryce | July 6, 1943 |
| 2,342,874 | Links | Feb. 29, 1944 |